United States Patent
Yeo et al.

(10) Patent No.: US 9,143,002 B2
(45) Date of Patent: Sep. 22, 2015

(54) WIRELESS ELECTRIC POWER RECEIVER FOR WIRELESSLY REGULATING ELECTRIC POWER USING SWITCH

(71) Applicants: Samsung Electronics Co., Ltd., Gyeonggi-do (KR); Korea Advanced Institute of Science and Technology, Daejeon (KR)

(72) Inventors: Sung-Ku Yeo, Daejeon (KR); Gyu-Hyeong Cho, Daejeon (KR); Se-Ho Park, Gyeonggi-do (KR); Jun-Han Choi, Daejeon (KR)

(73) Assignees: Samsung Electronics Co., Ltd. (KR); Korea Advanced Institute of Science and Technology (KR)

( * ) Notice: Subject to any disclaimer, the term of this patent is extended or adjusted under 35 U.S.C. 154(b) by 156 days.

(21) Appl. No.: 14/054,088

(22) Filed: Oct. 15, 2013

(65) Prior Publication Data

US 2014/0106826 A1    Apr. 17, 2014

(30) Foreign Application Priority Data

Oct. 12, 2012   (KR) .................. 10-2012-0113579
Jun. 4, 2013    (KR) .................. 10-2013-0064146

(51) Int. Cl.
*H04M 1/00* (2006.01)
*H04B 1/38* (2015.01)
*H02J 7/02* (2006.01)
*H02J 5/00* (2006.01)
*H02J 17/00* (2006.01)

(52) U.S. Cl.
CPC ............. *H02J 7/025* (2013.01); *H02J 5/005* (2013.01); *H02J 17/00* (2013.01)

(58) Field of Classification Search
USPC ............. 455/41.1, 572, 573, 343.1, 343.6; 340/13.24, 13.25, 13.26
See application file for complete search history.

(56) References Cited

U.S. PATENT DOCUMENTS

| | | | |
|---|---|---|---|
| 6,781,852 B2 * | 8/2004 | Hatta et al. ................ | 363/17 |
| 7,839,124 B2 * | 11/2010 | Yamazaki et al. ........... | 320/134 |
| 8,126,515 B2 * | 2/2012 | Watanabe et al. ............ | 455/572 |
| 8,803,474 B2 * | 8/2014 | Hillan et al. ................. | 320/108 |
| 9,013,897 B2 * | 4/2015 | Hsu ........................ | 363/21.1 |
| 9,026,046 B2 * | 5/2015 | Lefley ..................... | 455/41.1 |
| 9,030,051 B2 * | 5/2015 | Muratov ................... | 307/104 |
| 2010/0144402 A1 * | 6/2010 | Watanabe et al. ............ | 455/572 |
| 2010/0164295 A1 | 7/2010 | Ichikawa et al. | |
| 2010/0244576 A1 * | 9/2010 | Hillan et al. ................ | 307/104 |
| 2010/0264746 A1 * | 10/2010 | Kazama et al. .............. | 307/104 |
| 2010/0277003 A1 | 11/2010 | Von Novak et al. | |
| 2011/0260548 A1 * | 10/2011 | Urano ...................... | 307/104 |
| 2011/0300798 A1 * | 12/2011 | Lefley ..................... | 455/41.1 |

* cited by examiner

*Primary Examiner* — Tuan A Tran
(74) *Attorney, Agent, or Firm* — The Farrell Law Firm, P.C.

(57) ABSTRACT

A wireless electric power receiver for receiving wireless electric power from a wireless electric transmitter is provided. The wireless electric power receiver includes an electric power receiving unit that receives wireless electric power from the wireless electric power transmitter; a rectifying unit that rectifies wireless electric power in the form of alternating current output from the wireless electric power receiving unit and outputs rectified electric power; and an electric power regulation unit that receives an input of the rectified electric power, outputs first electric power which has a lower value of a first voltage than that of the rectified electric power for a first period, and does not output electric power for a second period, so as to output electric power with a predetermined voltage value.

12 Claims, 12 Drawing Sheets

WIRELESS ELECTRIC POWER RECEIVER FOR WIRELESSLY REGULATING ELECTRIC POWER USING SWITCH

PRIORITY

This application claims priority under 35 U.S.C. §119(a) to Korean Application Serial No. 10-2012-0113579, which was filed in the Korean Intellectual Property Office on Oct. 12, 2012, and Korean Application Serial No. 10-2013-0064146, which was filed in the Korean Intellectual Property Office on Jun. 4, 2013, the entire contents of each of which are incorporated herein by reference.

BACKGROUND OF THE INVENTION

1. Field of the Invention

The present invention generally relates to a wireless electric power receiver, and more particularly to a wireless electric power receiver for wirelessly receiving electric power based on an electromagnetic resonance scheme.

2. Description of the Related Art

A mobile terminal, such as portable telephones and Personal Digital Assistants (PDA), is typically operated by a rechargeable battery. In order to charge the battery, the battery of the mobile terminal is supplied with electric energy by using a separate charging device. Typically, the charging device and the battery have separate contact terminals on an exterior thereof, respectively, and are electrically connected with each other by the contacting their contact terminals.

However, in the contact type charging method, since the contact terminals protrude toward an exterior, the contact terminals may be easily damaged or become dirty due to alien substances. As a result, there is problem in that the charging of the battery is not properly performed. Where the contact terminals are exposed to moisture, the charging of the battery may not be properly performed.

In order to solve the above mentioned problems, wireless charging technologies or noncontact charging technologies have been recently developed and utilized for many electronic devices.

In the wireless charging technologies, wireless electric power transmission and reception techniques are used. For example, when a portable terminal is not connected to a separate charging connector and merely put on a charging pad, a battery of the portable terminal is automatically charged. The wireless charging technologies have advantages in that electronic products are wirelessly charged resulting in an improvement of a waterproof function, and the portability of electronic devices can be improved because a wired charging device is unnecessary. Further, it is forecasted that related technologies will significantly grow in the coming electric vehicle era.

The wireless charging technologies generally include an electromagnetic induction scheme using a coil, a resonance scheme using resonance, and an RF/Micro wave radiation scheme in which electric energy is converted into microwaves and then transmitted.

Up to now, the electromagnetic induction scheme has become mainstream. Recently, domestic and foreign experiments have been successful in using microwaves at distances of several tens of meters to wirelessly transfer electric power. In the near future, it is expected that all electronic products will be wirelessly charged without electric wires anywhere and anytime.

Transfer of electric power using electromagnetic induction is a scheme that transfers electric power between a first coil and a second coil. When a magnet is moved in a coil, induction current occurs. By using the induction current, a magnetic field is generated at a transferring end, and electric current is induced according to a change of the magnetic field so as to create energy at a reception end. This is referred to as magnetic induction phenomenon, and a method of transferring electric power using magnetic induction has remarkable energy transfer efficiency.

In the resonance scheme, a system for wirelessly transferring electricity by using the electric power transfer principle at a distance of several meters from a charging device in a Coupled Mode Theory has been developed. This wireless charging system resonates electromagnetic waves, and since a part of the resonated electric energy is directly transferred to a device having an identical resonance frequency when the device having the identical resonance frequency appears, and residual waves are absorbed again into an electromagnetic field without a distribution in air, it seems that the resonated electric energy has no effect on a peripheral machine or the human body different from other electromagnetic waves.

On the other hand, a wireless electric power receiver using a conventional resonance scheme includes a rectifier circuit for converting received alternating current waves into direct current waves, and a DC-DC conversion circuit for regulating electric power of the rectified direct waves to a predetermined voltage value. However, because the DC-DC conversion circuit must use a manual element with a large external value, there is a difficulty in that the circuit is implemented to have a small mounting surface, a high capacity and a high efficiency. In a case where the wireless electric power receiver is implemented in a mobile communication device, an increase of the mounting surface has a negative effect on the thickness of the mobile communication device.

SUMMARY OF THE INVENTION

The present invention has been made to address the above mentioned problems and disadvantages, and to provide at least the advantages described below. Accordingly, an aspect of the present invention is to provide a wireless electric power receiver for controlling received wireless electric power by using a switch, thereby regulating the magnitude of the wireless electric power.

In accordance with an aspect of the present invention, a wireless electric power receiver for receiving wireless electric power from a wireless electric power transmitter is provided. The wireless electric power receiver includes an electric power receiving unit that receives the wireless electric power from the wireless electric power transmitter; a rectifying unit that rectifies wireless electric power in a form of alternate current output from the wireless electric power receiving unit and outputs rectified electric power; and an electric power regulation unit that receives an input of the rectified electric power, outputs first electric power which has a lower value of a first voltage than that of the rectified electric power for a first period, and does not output electric power for a second period, so as to output electric power with a predetermined voltage value.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
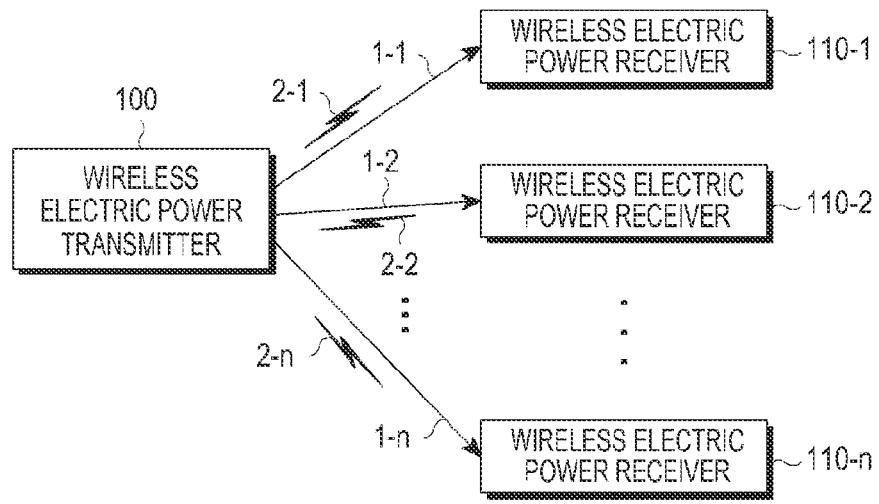
FIG. 1 is a conceptual view illustrating operation of a wireless charging system.

Hereinafter, various embodiments of the present invention will be described with reference to the accompanying drawings. It should be noted that the same components of the drawings are designated by the same reference numeral throughout the drawings and description. In the following description of the present invention, a detailed description of known functions and configurations incorporated herein will be omitted when it may make the subject matter of the present invention unclear.

FIG. 1 is a conceptual view illustrating operation of a wireless charging system. As shown in FIG. 1, the wireless charging system includes a wireless electric power transmitter 100 and one or more wireless electric power receivers 110-1, 110-2, . . . , and 110-n.

The wireless electric power transmitter 100 wirelessly transmits electric power 1-1, 1-2, . . . , and 1-n to the one or more wireless electric power receivers 110-1, 110-2, . . . , and 110-n. More particularly, the wireless electric transmitter 100 may wirelessly transmit electric power 1-1, 1-2, . . . , and 1-n to only wireless electric power receivers which are certificated through a predetermined certification procedure.

The wireless electric power transmitter 100 is electrically connected to the wireless electric power receivers 110-1, 110-2, . . . , and 110-n. For example, the wireless electric power transmitter 100 may transmit wireless electric power in a form of electromagnetic waves to the wireless electric power receivers 110-1, 110-2, . . . , and 110-n.

On the other hand, the wireless electric power transmitter 100 is capable of performing a bidirectional communication with the wireless electric power receivers 110-1, 110-2, . . . , and 110-n. Here, the wireless electric power transmitter 100 and the wireless electric power receivers 110-1, 110-2, . . . , and 110-n process packets 2-1, 2-2, . . . , 2-n including a predetermined number of frames, or transmit and receive the packets. The above mentioned frames will be described in detail below. The wireless electric power receiver may be implemented in a mobile communication terminal, a PDA, a PMP, a smartphone and the like.

The wireless electric power transmitter 100 is capable of wirelessly providing electric power to a plurality of wireless electric power receivers 110-1, 110-2, . . . , and 110-n. For example, the wireless electric power transmitter 100 is capable of wirelessly transmitting electric power to a plurality of wireless electric power receivers 110-1, 110-2, . . . , and 110-n in a resonance manner. Where the wireless electric transmitter 100 employs the resonance scheme, a distance between the wireless electric power transmitter 100 and the plurality of wireless electric power receivers 110-1, 110-2, . . . , and 110-n is preferably within about 30 m. Where the wireless electric transmitter 100 employs the electromagnetic induction resonance scheme, a distance between the wireless electric power transmitter 100 and the plurality of wireless electric power receivers 110-1, 110-2, . . . , and 110-n is preferably within about 10 cm.

The wireless electric power receivers 110-1, 110-2, . . . , and 110-n wirelessly receive electric power from the wireless electric power transmitter 100 and charge a battery included in a mobile terminal. Further, the wireless electric power receivers 110-1, 110-2, . . . , and 110-n transmit a signal to request a wireless electric transmission, information necessary for a reception of wireless electric power, information on a status of the wireless electric power receivers, or information on a control of the wireless electric power transmitter 100, to the wireless electric power transmitter 100. The information on the transmission signal will be described in detail later.

Furthermore, the wireless electric power receivers 110-1, 110-2, . . . , and 100-n transmit a message indicating a charged status of each receiver to the wireless electric power transmitter 100.

The wireless electric power transmitter 100 may include an indicating means such as a display unit, and display the status of each of the wireless electric power receivers 110-1, 110-2, . . . , and 110-n, based on the message received from each of the wireless electric power receivers 110-1, 110-2, . . . , and 110-n. In addition, the wireless electric power transmitter 100 may display an expected time until the respective wireless electric power receivers 110-1, 110-2, . . . , and 110-n are charged.

The wireless electric power transmitter 100 may transmit a control signal to disable the wireless charging function of the wireless electric receivers 110-1, 110-2, . . . , and 110-n. When receiving a control signal to disable the wireless charging function from the wireless electric power transmitter 100, the wireless electric power receivers are capable of disabling the wireless charging function.

Figure 2:
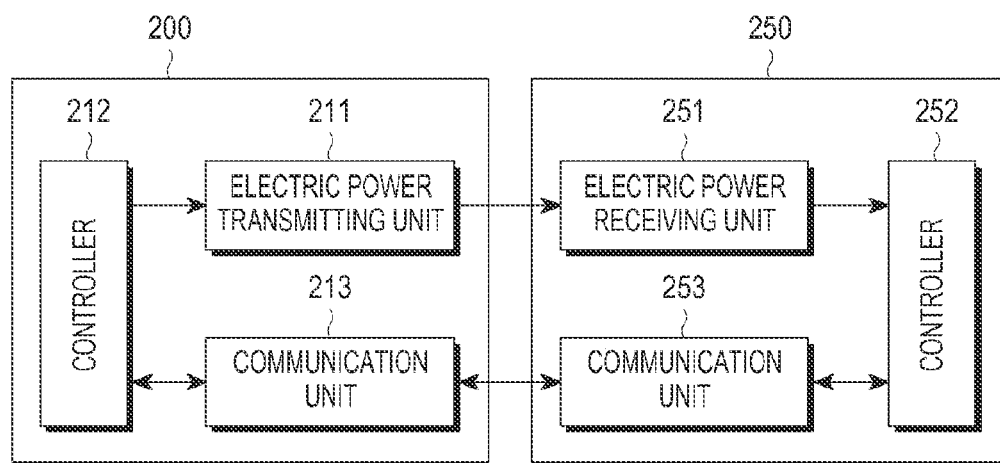
FIG. 2 is a block diagram illustrating a wireless electric power transmitter and a wireless electric power receiver according to an embodiment of the present invention.

FIG. 2 is a block diagram illustrating a wireless electric power transmitter and a wireless electric power receiver according to an embodiment of the present invention.

As shown in FIG. 2, the wireless electric power transmitter 200 includes an electric power transmitting unit 211, a controller 212 and a communication unit 213. Further, the wireless electric receiver 250 includes an electric power receiving unit 251, a controller 252 and a communication unit 253.

The electric power transmitting unit 211 is capable of supplying electric power which is required by the wireless electric power transmitter 200, and wirelessly provides electric power to the wireless electric receiver 250. Here, the electric power transmitting unit 211 provides electric power in a form of alternating current (AC) waves, and also may supply electric power in a form of direct current (DC) waves. Furthermore, the electric power transmitting unit 211 converts the DC waves into the AC waves by using an inverter so as to provide the electric power in the form of alternating current. The electric power transmitting unit 211 may be implemented in the form of an embedded battery or in the form of an electric power receiving interface so as to receive electric power from outside thereof and supply electric power to the other structural elements. It will be easily understood by a person skilled in the art that the electric power transmitting unit 211 is not limited if it supplies electric power as constant AC waves.

In addition, the electric power transmitting unit 211 may supply the AC waves to the wireless electric receiver 250 in the form of electromagnetic waves. The electric power transmitting unit 211 further includes an additional loop coil, resulting in a transmission or a reception of desired electromagnetic waves. Where the electric power transmitting unit 211 is implemented by the loop coil, an inductance L of the loop coil may be varied. On the other hand, it will be easily understood by a person skilled in the art that the electric power transmitting unit 211 is not limited as a means for transmitting and receiving the electromagnetic waves.

The controller 212 controls the overall operation of the wireless electric power transmitter 200, by using an algorithm, a program, or an application which is required for a control and read from a storage unit (not shown). The controller 212 may be implemented in a form of a CPU, a microprocessor, a mini computer and the like. Operation of the controller 212 will be described in detail later.

The communication unit 213 communicates with the wireless electric power receiver 250 in a specific manner. The communication unit 213 is capable of communicating with communication unit 253 of the wireless electric power receiver 250 by using a Near Field Communication (NFC) scheme, a Zigbee communication scheme, an infrared ray communication scheme, a visible ray communication scheme, a Bluetooth communication scheme, a Bluetooth low energy scheme, and the like. The communication unit 213 according to the embodiment of the present invention is capable of performing communication by using the Bluetooth low energy scheme. In addition, the communication unit 213 may use a CSMA/CA algorithm. A selection of frequency and channel which the communication unit 213 uses will be described in detail later. On the other hand, the above mentioned communication schemes are merely illustrative, and the scope of the present invention is not limited by a specific communication scheme which is performed by the communication unit 213.

Furthermore, the communication unit 213 may transmit a signal for information of the wireless electric power transmitter 200. Here, the communication unit 213 is capable of performing a unicast, a multicast, or a broadcast.

The communication unit 213 receives electric power information from the wireless electric power receiver 250. Here, the electric power information may include at least one of a capacity of the wireless electric power receiver 250, a remaining capacity of a battery, frequency of charges, the amount of used battery capacity, a battery capacity and a used (or remaining) proportion of the battery. Further, the communication unit 213 transmits a signal to control a charging function of the wireless electric power receiver 250. The signal to control the charging function may be a control signal of controlling the wireless electric power receiving unit 251 of the specific wireless electric power receiver 250 so as to enable or disable the charging function.

The communication unit 213 may receive a signal from another wireless electric power transmitter (not shown) as well as the wireless electric power receiver 250. For example, the communication unit 213 may receive a notice signal of the frame in the above mentioned FIG. 1 from another wireless electric power transmitter.

On the other hand, in FIG. 2, it is shown that the electric power transmitting unit 211 and the communication unit 213 are configured with different hardware, and the wireless electric power transmitter 200 communicates in an out-band manner, but it is merely illustrative. In the present invention, the electric power transmitting unit 211 and the communication unit 213 are implemented with one piece of hardware so that the wireless electric power transmitter 200 performs communication in an in-band manner.

The wireless electric power transmitter 200 and the wireless electric power receiver 250 transmit and receive various signals. Accordingly, the wireless electric power receiver 250 enters a wireless electric power network which is managed by the wireless electric power transmitter 200 and performs a charging process through wireless electric power transmission and reception. The above mentioned process will be described in detail later.

Figure 3:
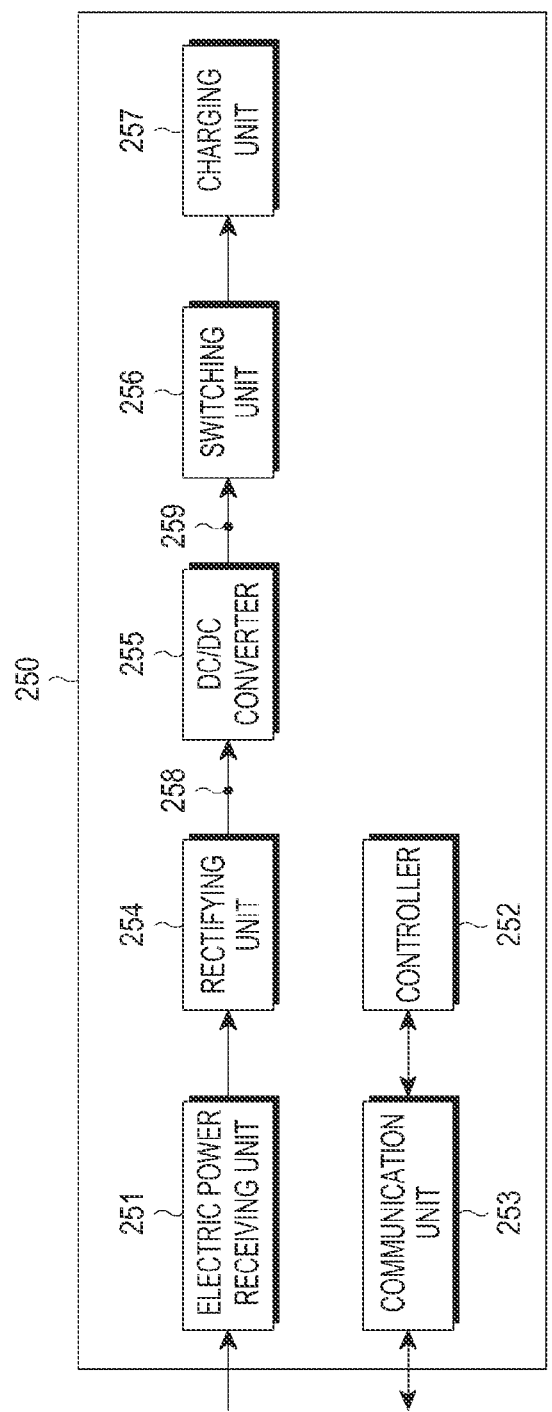
FIG. 3 is a block diagram illustrating a wireless electric power receiver according to a related art, in which the wireless electric power receiver is shown to be compared with the present invention.

FIG. 3 is a block diagram illustrating a wireless electric power receiver according to a related art, in which the wireless electric power receiver is shown to be compared with the present invention.

As shown in FIG. 3, the wireless electric power receiver 250 includes an electric power receiving unit 251, a controller 252, a communication unit 253, a rectifying unit 254, a DC/DC converter 255, a switching unit 256 56 and a charging unit 257.

A description of the electric power receiving unit 251, the controller 252 and the communication unit 253 was described above and will be omitted herein. The rectifying unit 254 is capable of rectifying wireless electric power received in the electric power receiving unit 251 in the form of direct current, and is implemented in a form of bridge diode. The DC/DC converter 255 converts the rectified electric current into a predetermined gain. For example, the DC/DC converter 255 converts the rectified electric current so that a voltage at an output end 259 becomes 5V.

The switching unit 256 connects the DC/DC converter 255 to the charging unit 257. The switching unit 256 is held in an on/off state under the control of the controller 252. When the switching unit 256 is in the on state, the charging unit 257 stores converted electric power which is input from the DC/DC converter 255.

However, the wireless electric power receiver 250 according to a comparison example which is compared with the present invention includes the DC/DC converter 255. Accordingly, the number of manual elements and Integrated Circuits increase, and it is difficult to miniaturize the wireless electric power receiver 250.

Figure 4:
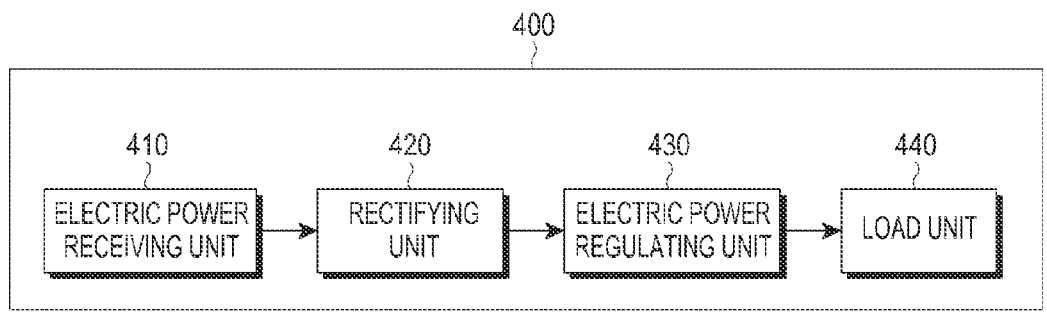
FIG. 4 is a block diagram illustrating a wireless electric power receiver according to the present invention.

FIG. 4 is a block diagram illustrating a wireless electric power receiver according to an embodiment of the present invention.

As shown in FIG. 4, the wireless electric power receiver 400 includes an electric power receiving unit 410, a rectifying unit 420, an electric power regulating unit 430 and a rod unit 430.

The electric power receiving unit 410 receives electric power from an wireless electric power transmitter (not shown). The rectifying unit 420 rectifies electric power in the form of alternate current (AC) which is received from the electric power receiving unit 410 and outputs the electric power in a form of direct current (DC). The electric power regulating unit 430 converts and regulates the rectified electric power having a predetermined value, for example a voltage of 5V, and then outputs the electric power. The load unit 440 may store the electric power.

In particular, the electric power regulating unit 430 outputs first electric power with a first voltage value for a first period, and second electric power with a second voltage value for a second period. Thus, the electric power regulating unit 430 outputs electric power with the predetermined value, for example the voltage of 5V. Furthermore, the electric power regulating unit 430 does not include converting means which has a manual element, and is capable of converting the voltage value of the electric power merely based on an on/off regulation of the switch. Accordingly, it is possible to miniaturize and make the wireless electric power receiver light weight in comparison with the conventional DC-DC conversion circuit. According to an embodiment of the present invention, the total number of manual elements and Integrated Circuits can be remarkably reduced. Further, the wireless electric power receiver includes a resonance type inductor and capacitor as well as a switch, thereby obtaining stable direct current electric power. Moreover, it is possible to provide more exact and stable direct current electric power.

Figure 5A:
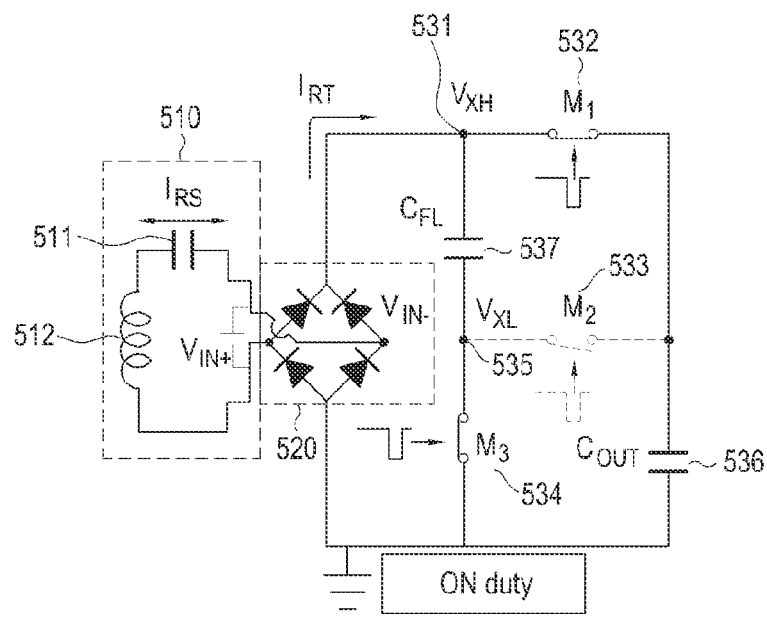
FIGS. 5A to 5C are circuit diagrams illustrating the wireless electric power receiver according to embodiments of the present invention.

FIG. 5A is a circuit diagram illustrating the wireless electric power receiver according to the embodiment of the present invention. More specifically, the embodiment of FIG. 5A is a circuit diagram of the wireless electric power receiver 400 in the first period shown in FIG. 4.

As shown in FIG. 5A, the wireless electric power receiver includes a resonance circuit 510, a rectifying circuit 520, a first switch 532, a second switch 533, a third switch 534, a first capacitor 536, and a second capacitor 537.

The resonance circuit 510 includes a capacitor 511 and an induction coil 512, and receives electric power with a value of $I_{RS}$ from the wireless electric power transmitter based on a resonance scheme.

The rectifying circuit 520 includes at least one diode, and rectifies and converts the alternate current electric power, which is input from the resonance circuit 510, into direct current so as to output the electric power. The rectifying circuit 520 outputs the rectified electric power which has a current value of $I_{RT}$ and a voltage value of $V_{XH}$.

The rectifying circuit 520 is connected to a first node 531. The voltage value of $V_{XH}$ is applied to the first node 531. The first node 531 is connected to the first switch 532 and the second capacitor 537. The second capacitor 537 has an electrostatic capacity of $C_{FL}$. Here, the first capacitor 536 and the second capacitor 537 may be variable capacitors, and the electrostatic capacities $C_{out}$ and $C_{FL}$ may be changed. As the electrostatic capacities of the first capacitor 536 and the second capacitor 537 are adjusted, an output voltage is adjusted in the second period (OFF duty). The electrostatic capacities $C_{out}$ and $C_{FL}$ use a voltage division, and may be called a capacitive voltage divider. In addition, it is possible to use a capacity value which is necessary for a regulation in the first period (ON duty) according to the transmitted electric power. The first period (ON duty) and the second period (OFF duty) will be described in detail later.

The first switch 532, the second switch 533 and the third switch 534 may be implemented with a high-side PMOS switch or a low-side NMOS switch. Accordingly, an integration of the first switch 532, the second switch 533, the third switch 534 and a rectifying circuit is possible.

Figure 6A:
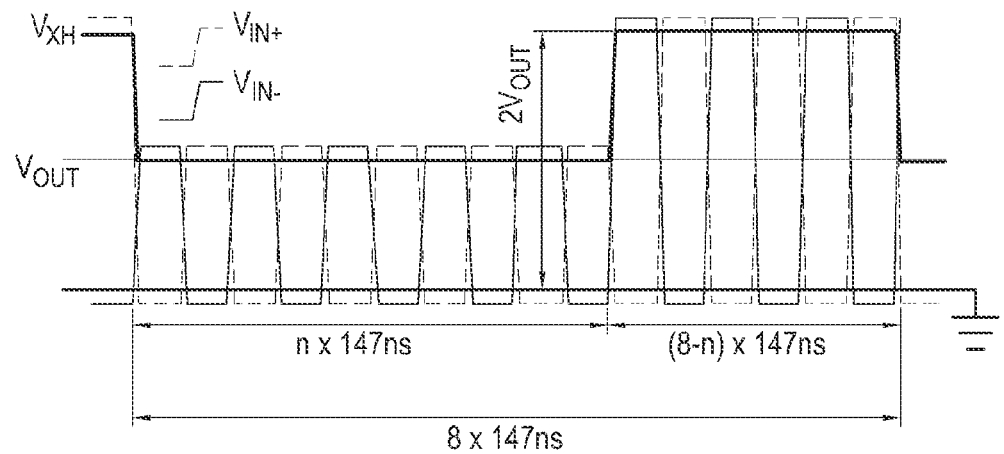
FIGS. 6A and 6B are graphs illustrating a voltage of an output terminal in a continuous current mode and a non-continuous current mode, respectively.

One end of the first switch 532 is connected to the first node 531, and the other end of the first switch 532 is connected to one end of the first capacitor 536. For the first period, the first switch 532 is controlled to be on, and thus the rectifying circuit 520 may be connected to one end of the first capacitor 536. On the other hand, the other end of the second capacitor 537 is connected to a second node 535, and the second node 535 is connected to one end of the second switch 533 and one end of the third switch 534. The other end of the second switch 533 is connected to the other end of the first switch 532 and one end of the first capacitor 536. In particular, the second switch 533 is controlled to be in the off state for the first period. The second node 535 is connected to one end of the third switch 534, and the other end of the third switch 534 is connected to the other end of the first capacitor 536 and a ground. For the first period, the third switch 534 is controlled to be in an on state, and thus the other end of the second capacitor 537 is connected to ground. That is, for the first period, the first switch 532 and the third switch 534 are controlled to be in an on state, and the second switch 533 is controlled to be in an off state. Therefore, the voltage value of $V_{XH}$ applied to the first node 531 may be dispersed to the first capacitor 536 and the second capacitor 537. This is caused by a parallel connection of the first and second capacitors 536 and 537. Thus, a voltage value of the first capacitor 536 has a smaller value than the voltage value of $V_{XH}$ shown in FIG. 6A, which shows a graph of a voltage value applied to the output end for the first period. As shown in FIG. 6A, a voltage $V_{out}$ of the output end is lower than the voltage value of $V_{XH}$ for the first period (ON duty).

Figure 5B:
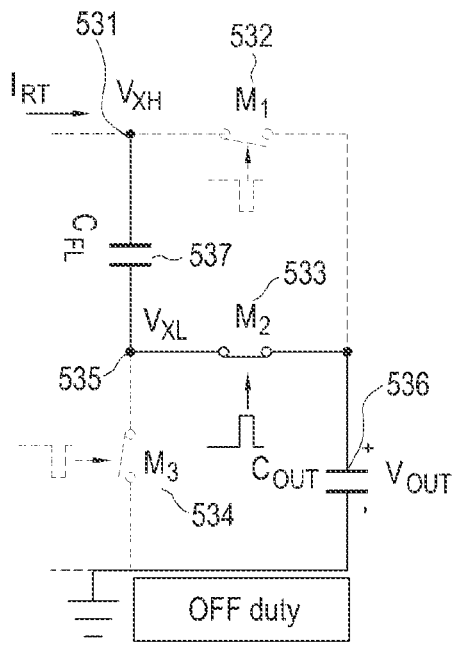

FIG. 5B is a circuit diagram illustrating the wireless electric power receiver according to an embodiment of the present invention. More specifically, the embodiment of FIG. 5B is the circuit diagram of the wireless electric power receiver 400 in the second period shown in FIG. 4.

FIG. 5B shows only the right side of the rectifying circuit 520 of FIG. 5A. For the second period, as shown in FIG. 5B, the first and third switches 532 and 534 are controlled to be in an off state, and the second switch 533 is controlled to be in an on state. Therefore, the first node 531 is connected to the second capacitor 537, and the second capacitor 537 is connected to the first capacitor 536. As a result, the voltage value of $V_{HX}$ applied to the first node 531 is applied to the first capacitor 536. Thus, the first capacitor 536, which is the output end, has the voltage value of $V_{XH}$ shown in FIG. 6A. This is caused by the serial connection of the first and second capacitors 536 and 537. FIG. 6A shows a graph of the voltage value applied to the output end for the second period. As shown in FIG. 6A, the voltage $V_{out}$ of the output end is the voltage value of $V_{XH}$ for the second period (OFF duty). As described above, the capacitor 536 has a smaller output voltage than the voltage value of $V_{XH}$ for the first period, and has the output voltage value of $V_{XH}$ for the second period, so as to output a predetermined voltage value, for example 5V, for a total period.

Figure 7A:
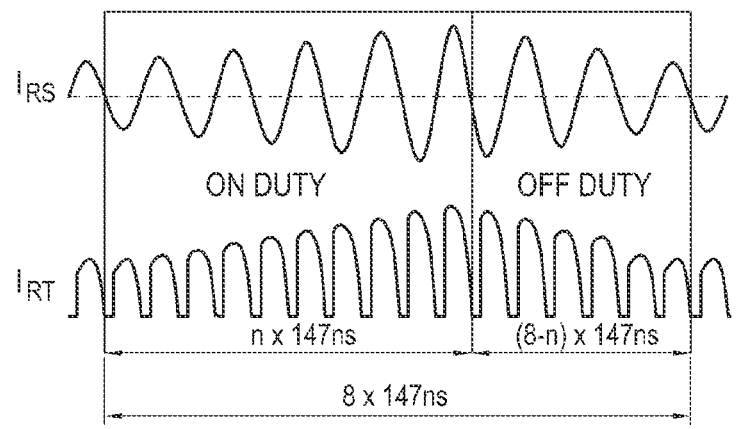
FIGS. 7A and 7B are graphs illustrating a voltage of an output terminal in a continuous current mode and a non-continuous current mode, respectively.

On the other hand, an output voltage mode of the first and second periods may be referred to as a Continuous Current Mode (CCM). FIG. 7A is a graph showing the current in the CCM. As shown in FIG. 7A, $I_{RS}$ and $I_{RT}$ increase for the first period (ON duty), while decreasing for the second period (OFF duty). However, the current for the first and second periods may be continuous. The increasing of the current for the first period (ON duty) is caused by an increase of the transmitted electric power due to a decrease of equivalent impedance in view of the wireless electric power transmitter.

On the other hand, the decreasing of the current for the second period (OFF duty) is caused by a decrease of the transmitted electric power due to an increase of the equivalent impedance in view of the wireless electric power transmitter. The CCM may be used when the transmitted electric power is large, and a Discontinuous Current Mode (DCM) may be used when the transmitted electric power is small.

Figure 5C:
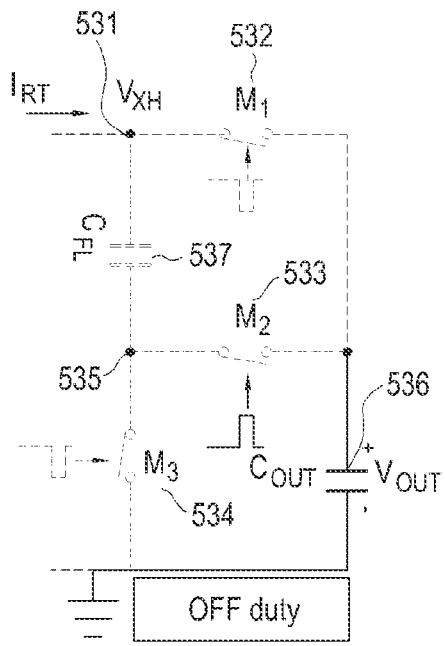
Figure 6B:
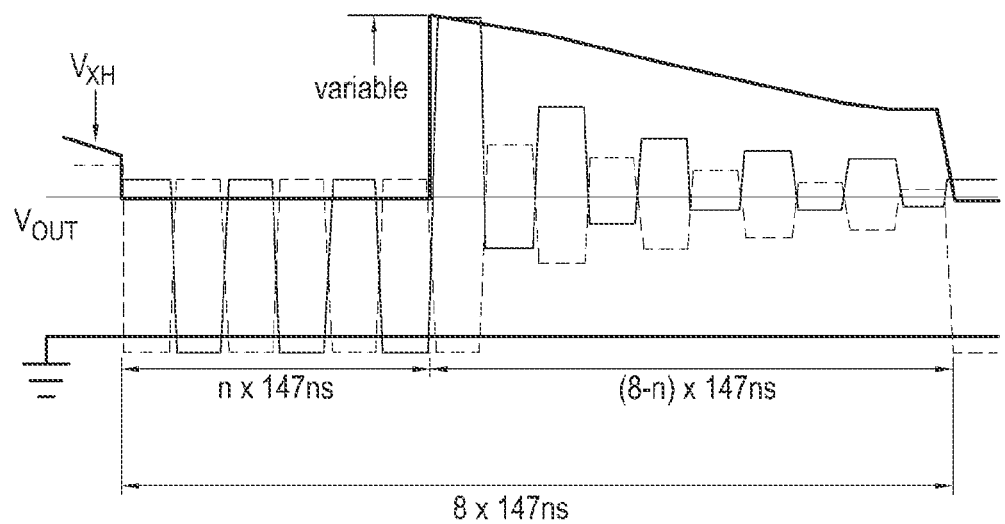

FIG. 5C is a circuit diagram for the second period in a DCM. The circuit diagram for the first period in the DCM may be identical to that as shown in FIG. 5A. For the second period, as shown in FIG. 5C, the first, second and third switches 531, 532 and 534 are controlled to be in the off state. Therefore, the voltage applied to the first capacitor 536, which is the output end, has a value attenuating from the voltage value of $V_{XH}$, as shown in FIG. 6B. That is, the voltage value which is lower than $V_{XH}$ is output for the first period, and the voltage value which attenuates from the $V_{XH}$ is output for the second period. Accordingly, the predetermined voltage, i.e. a voltage value of 5V, may be output for the total period.

Figure 7B:
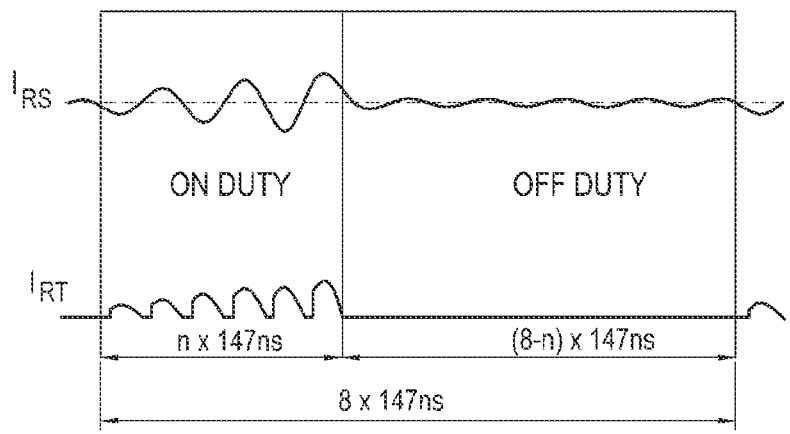

FIG. 7B is a graph showing a value of current in the DCM. As shown in FIG. 7B, $I_{RS}$ and $I_{RT}$ have a value of zero for the second period. This is caused by the voltage value of $V_{XH}$ in "a floating state". The phrase "floating state" means a state in that an electric power source and ground which are capable of inducing an electric potential difference are not connected to each other, and a meaning of "floating state" will be clearly understood by a person skilled in the art.

As described above, although a manual element is not included in the CCM or DCM, the predetermined voltage, i.e. the voltage value of 5V, is stably maintained and output. The phrases "n*147 ns" and "(8−n)*147 ns" shown in FIGS. 7A and 7B mean that a period is 147 ns in the case that a frequency of 6.78 MHz (a carrier frequency satisfying a standard of A4WP) is used, and an on/off duty is controlled to be eight times of period. However, it should be understood that the frequency of 6.78 MHz is an example for the description of the present invention.

Figure 8A:
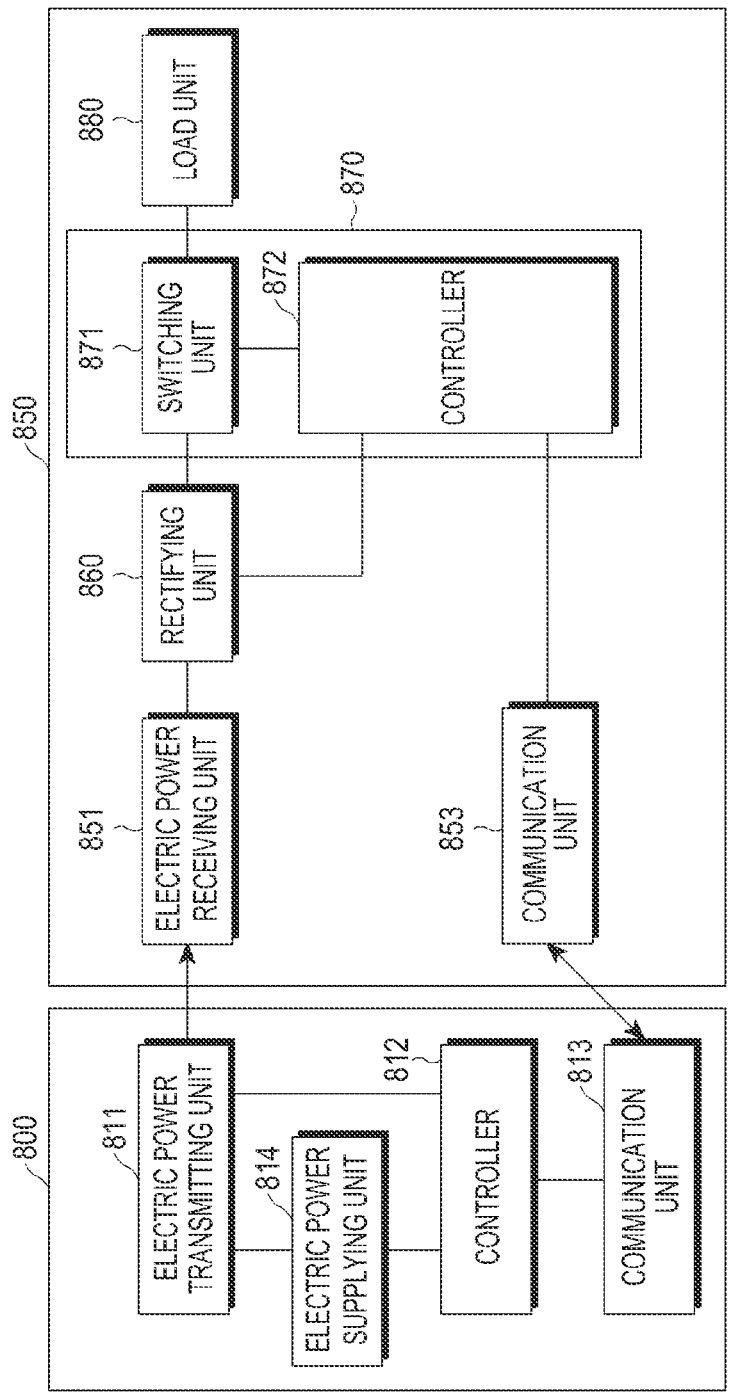
FIG. 8A is a block diagram illustrating a wireless electric power transmitter and a wireless electric power receiver according to an embodiment of the present invention.

FIG. 8A is a block diagram illustrating the wireless electric power transmitter and the wireless electric power receiver according to an embodiment of the present invention.

As shown in FIG. 8, the wireless electric power transmitter 800 includes an electric power transmitting unit 811, a controller 812, a communication unit 813 and an electric power supplying unit 814. In addition, the wireless electric power receiver 850 includes an electric power receiving unit 851, a communication unit 853, a rectifying unit 860, an electric power regulation unit 870 and a load unit 880. The electric power regulation unit 870 includes a switching unit 871 and a controller 872.

The electric power supplying unit 814 supplies electric power to the electric power transmitting unit 811, and an amount of supplied electric power is controlled by the controller 812. The electric power transmitting unit 811 is capable of wirelessly transmitting electric power to the electric power receiving unit 851 based on the resonance scheme.

The rectifying unit 860 rectifies input electric power, and outputs the rectified electric power to the electric power regulation unit 870. In particular, the rectifying unit 860 outputs the rectified electric power to the switching unit 870. The switching unit 870 includes at least one switch, and may output first electric power having a first voltage value or second electric power having a second voltage value, based on an on/off state of the switch. The electric power having the predetermined voltage, i.e. the voltage value of 5V, is output from the electric power regulation unit 870 as the first electric power and the second electric power.

The controller 872 receives an input of partial electric power from the rectifying unit 860. The controller 872 controls the on/off state of each switch included in the switching unit 870, based on the partial electric power input from the rectifying unit 860. The controller 872 controls the on/off state of each switch included in the switching unit 870 so that the first electric power having the first voltage value is output for the first period, or so that the second electric power having the second voltage value is output for the second period. Further, the controller 872 controls the on/off state of each switch included in the switching unit 870 so that the electric power having the predetermined voltage value, i.e. a voltage value of 5V, is output.

When excessive electric power is applied to the rectifying unit 860, the controller 872 controls the communication unit 853 to transmit a signal, which adjusts electric power output from the electric power supplying unit 814, to the communication unit 813.

The load unit 880 receives an input of electric power having a predetermined voltage value, i.e. a voltage value of 5V, output from the switching unit 870.

Figure 8B:
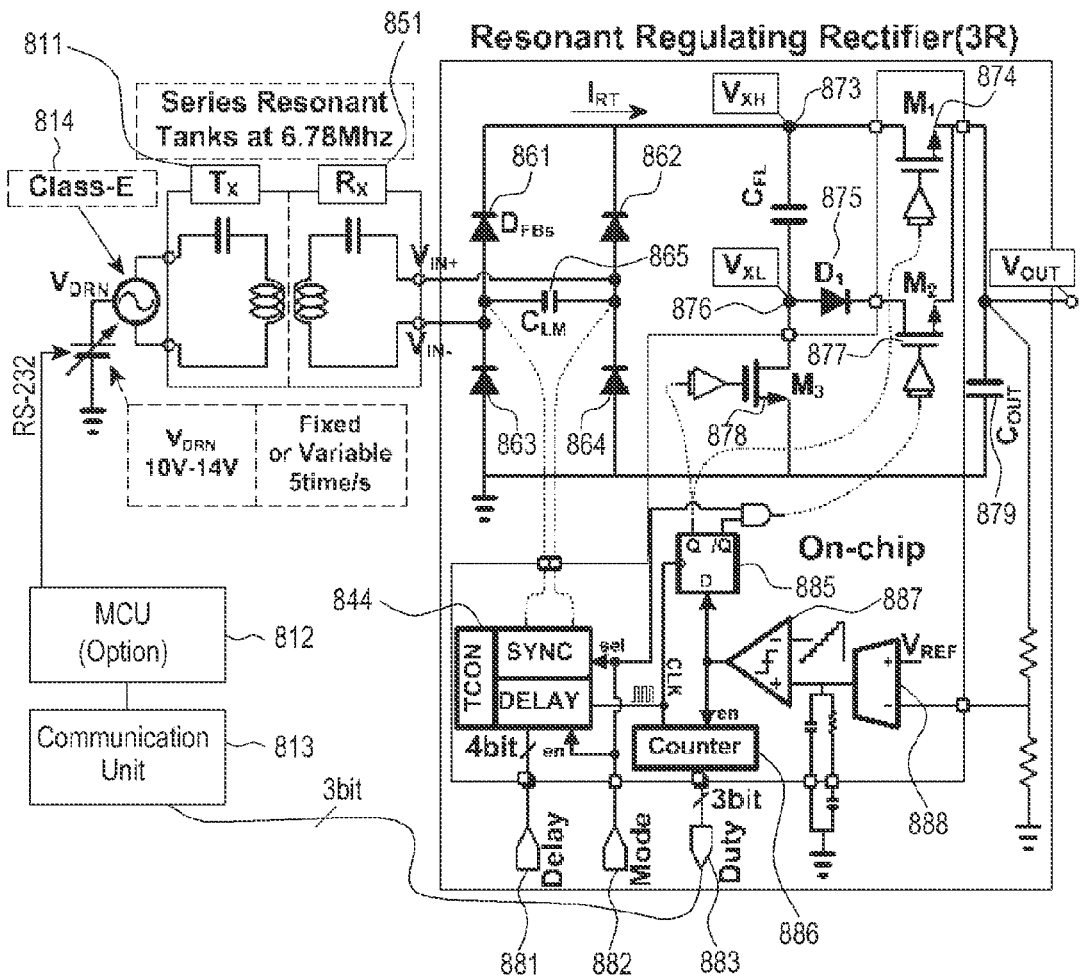
FIG. 8B is a circuit diagram illustrating the wireless electric power transmitter and the wireless electric power receiver according to an embodiment of the present invention.

FIG. 8B is a circuit diagram illustrating the wireless electric power transmitter and the wireless electric power receiver according to an embodiment of the present invention.

In FIG. 8B, the electric power supplying unit 814 includes electric power supplying means, a class E Amp, and an inverter. The electric power supplying means is variable in a range of 10V to 14V. The electric power transmitting unit 811 may include a resonance circuit. Here, the resonance frequency may be, for example, 6.78 Mhz.

The electric power receiving unit 851 wirelessly receives the electric power in resonance frequency of, for example, 6.78 Mhz, and includes a resonance circuit. The rectifying unit 860 includes first to fourth diodes 861, 862, 863 and 864, and a third capacitor 865 having an electrostatic capacity of $C_{LM}$. Signals of both ends of the third capacitor 865 are input into a timing controller 844. The timing controller 844 generates and outputs a clock signal (CLK) for controlling the on/off state of the first, second and third switches 874, 877 and 878. The timing controller 844 generates the clock signal based on a delay signal 881, a mode selection signal 882 and a duty signal 883. A gate driving signal generating element 885 generates and outputs a gate driving signal based on the clock signal. In addition, the gate driving signal generating element 885 may generate the gate driving signal by using an output result of the comparator 888 and the calculator 887. The generation of the gate driving signal will be described in detail later.

On the other hand, the on/off states of the first, second and third switches 874, 877 and 878 are controlled based on the clock signal. Based on the on/off states of the first, second and third switches 874, 877 and 878, for example, the first voltage is applied to an output end 879 for the first period, and the second voltage value is applied to an output end 879 for the second period.

Figure 9:
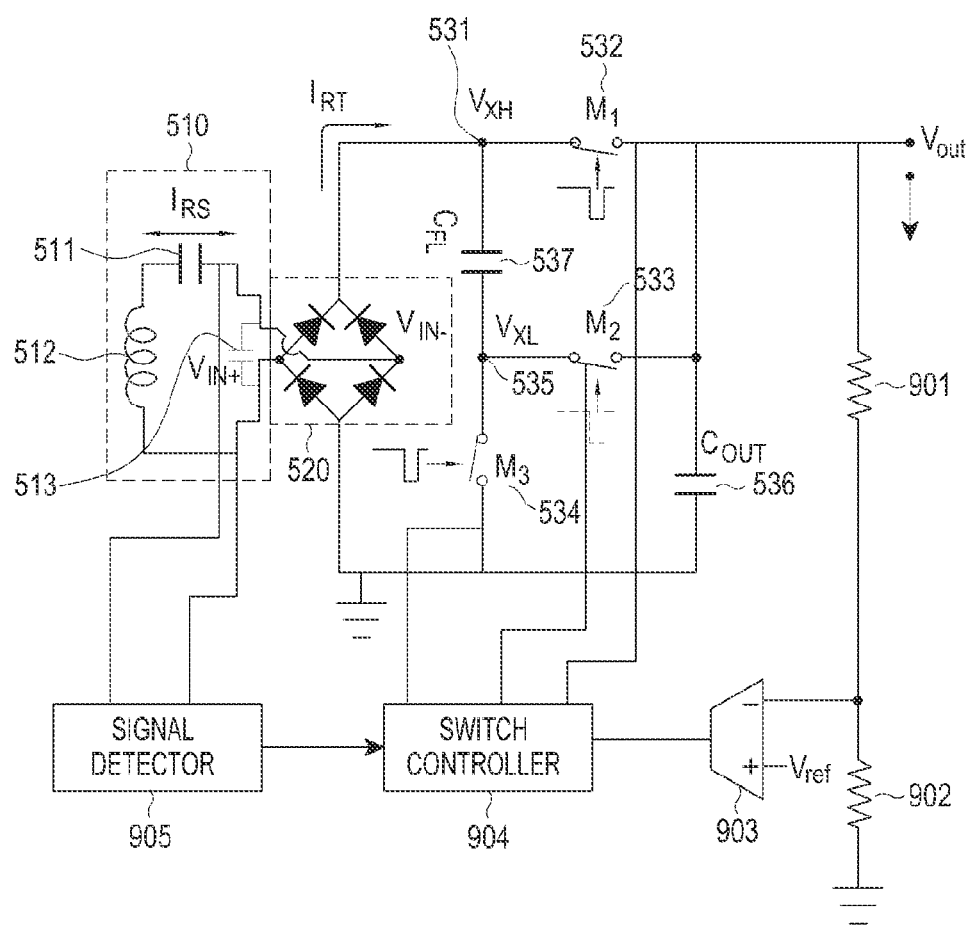
FIG. 9 is a circuit diagram illustrating the wireless electric power receiver according to the present invention.

FIG. 9 is a circuit diagram illustrating the wireless electric power receiver according to an embodiment of the present invention. With relation to FIG. 9, only additional structural elements will be described in comparison with FIG. 5A. Referring to FIG. 9, the wireless electric power receiver may include a first resistor 901, a second resistor 902, a comparator 903, a switch controller 904 and a signal detector 905.

The first resistor 901 has one end connected to an output end, and other end connected to one end of the second resistor 902 and a first input terminal (−) of the comparator 903. The other end of the second resistor 902 is connected to ground. A reference voltage $V_{ref}$ is applied to the second input terminal (+) of the comparator 903. The comparator 903 compares the reference voltage $V_{ref}$ with the voltage applied to the first input terminal (−), and outputs a comparison result to the switch controller 904. The switch controller 904 controls the on/off state of each of the first, second and third switches 532, 533 and 534 based on the comparison result. The signal detector 905 receives a feedback of an AC synchronization signal from the resonance circuit 510, and outputs the AC synchronization signal to the switch controller 904. The switch controller 904 controls the on/off states of each of the first, second and third switches 532, 533 and 534 based on the comparison result. For example, the reference voltage $V_{ref}$ of the comparator 903 may be set to 5V. When a voltage higher than the reference voltage of 5V is applied to the output end, the electric power regulation unit 870 controls the on/off state of the switch so that the voltage applied to the output end is held to a voltage of 5V. Referring to FIGS. 5A and 5B, as described above, for the first period in which the first and third switches 532 and 534 are controlled to be in the on state and the second switch 533 is controlled to be in the off state, the relatively low voltage is applied to the comparator 903. Moreover, for the second period in which the first switch 532 and the third switch 534 are controlled to be in the off state, and the second switch is controlled to be in the on state, a relatively high voltage is applied to the comparator 903. The electric power regulation unit 870 sets the first period to be relatively longer than an existing period, and regulates the voltage of the output end so that the voltage of 5V is constantly applied to the output end. Otherwise, where a voltage lower than the reference voltage of 5V is applied to the output end, the electric power regulation unit 870 sets the first period to be relatively short and regulates the voltage of the output end so that the voltage applied to the output end is held to a voltage of 5V.

On the other hand, in DCM, electric power is output for the first period while not being output for the second period. Where a voltage higher than the reference voltage of 5V is applied to the output end, the electric power regulation unit 870 sets the first period to be relatively short and regulates the voltage of the output end so that the voltage applied to the output end is held to a voltage of 5V. Further, where a voltage lower than the reference voltage of 5V is applied to the output end, the electric power regulation unit 870 sets the first period to be relatively long and regulates the voltage of the output end so that the voltage applied to the output end is held to a voltage of 5V.

Figure 10:
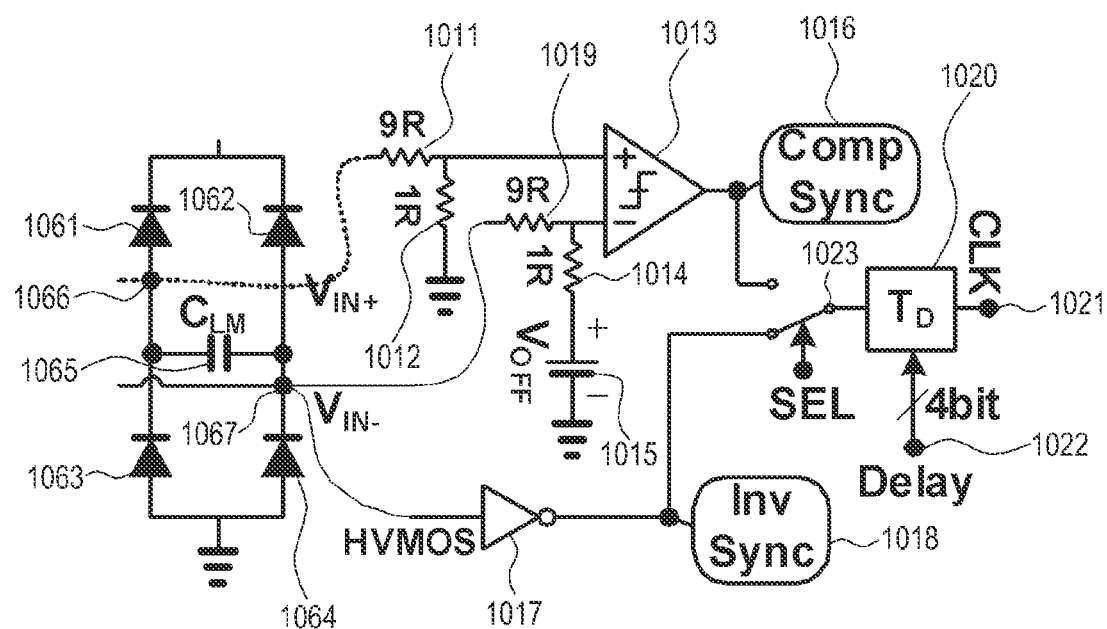
FIG. 10 is a circuit diagram illustrating a method of generating a control signal to turn on/off a switch according to an embodiment of the present invention.
Figure 11:
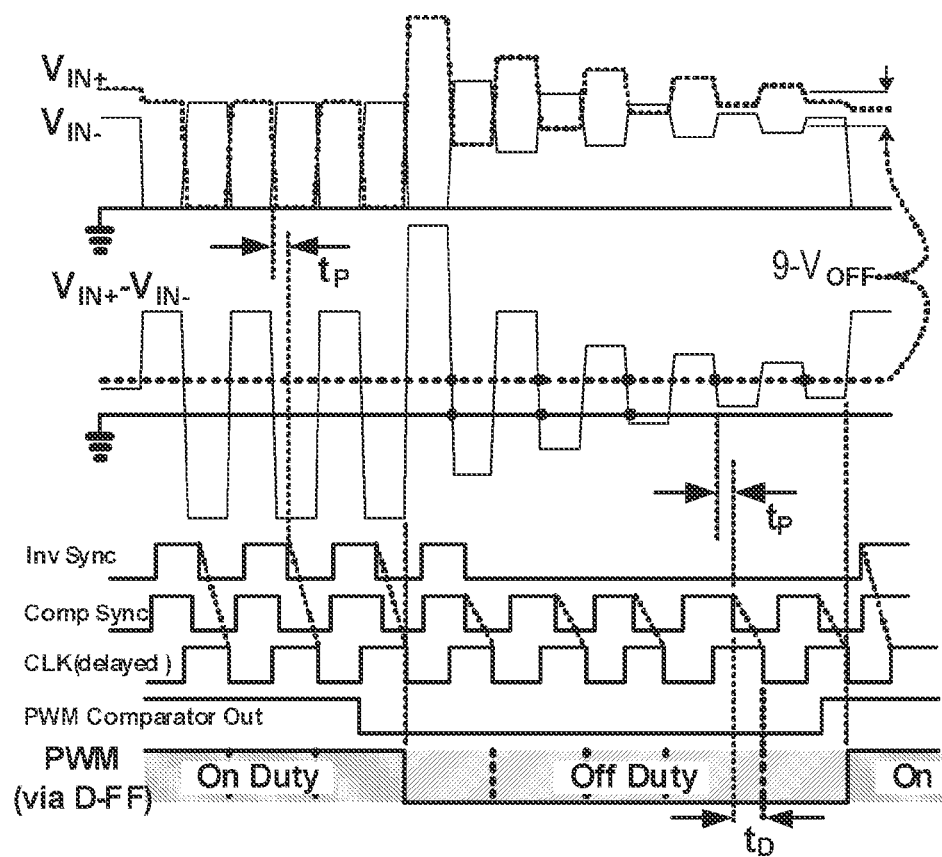
FIG. 11 is a graph illustrating generation of the control signal according to an embodiment of the present invention.

FIG. 10 is a circuit diagram illustrating a method of generating a switch on/off control signal according to an embodiment of the present invention. The operation of the circuit shown in FIG. 10 will be described with reference to FIG. 11. FIG. 11 is a graph illustrating a generation of the control signal according to an embodiment of the present invention.

The rectifying unit 860 includes first to fourth diodes 1061, 1062, 1063 and 1064, and a third capacitor 1065 having an electrostatic capacity of $C_{LM}$. A node 1066 is disposed between the first diode 1061 and the third diode 1063, and a node 1067 is disposed between the second diode 1062 and the fourth diode 1064. A $V_{IN+}$ is applied to the node 1066, and a $V_{IN-}$ is applied to the node 1067. Differential signals of the $V_{IN+}$ and the $V_{IN-}$ in FIG. 11 are applied to the node 1066 and the node 1067, respectively.

The node 1066 may be connected to one end of a resistor 1011, and other end of the resistor 1011 may be connected to one end of a resistor 1012. The other end of the resistor 1012 may be connected to ground. The other end of the resistor 1011 and the one end of the resistor 1012 is connected to a first input terminal (+) of the calculator 1013. On the other hand, one end of a resistor 1019 and one end of a resistor 1014 are connected to a second input terminal (−) of the calculator 1013. The other end of the resistor 1019 may be connected to node 1067, and the other end of the resistor 1014 may be connected to one end of a capacitor 1015. The other end of the capacitor 1015 may be connected to ground.

Accordingly, differential signals of a $V_{IN+}$ and a $V_{IN-}$ are input into the first input terminal (+) and the second input terminal (−) of the calculator 1013, respectively. The calculator 1013 calculates the differential signals to be input, and outputs a composite synchronization signal (Comp Sync) 1016. In FIG. 11, the composite synchronization signal may be generated by calculating the differential signals of the $V_{IN+}$ and the $V_{IN-}$.

The node 1067 is also connected to an inverter 1017. The inverter 1017 inverts a signal $V_{IN-}$ applied to the node 1067 and outputs an inverted synchronization signal (Inv Sync) 1018. In FIG. 11, the inverted synchronization signal (Inv Sync) is inverted and generated by the signal $V_{IN-}$. On the other hand, a selection signal (SEL) is applied to the switch 1023 to enable the switch to determine whether to receive the composite synchronization signal or the inverted synchronization signal. For example, the selection signal (SEL) controls the switch 1023 to receive the inverted synchronization signal for the first period (ON duty), and to receive the composite synchronization signal for the second period (OFF duty).

The delay unit 1020 delays the inverted synchronization signal (Inv Sync) or the composite synchronization signal so as to output a clock signal. As shown in FIG. 11, a clock signal (CLK) in which the inverted synchronization signal (Inv Sync) is delayed is generated for the first period (ON duty), and a clock signal (CLK) in which the composite synchronization signal (Comp Sync) is delayed is generated for the second period (OFF duty).

Figure 12:
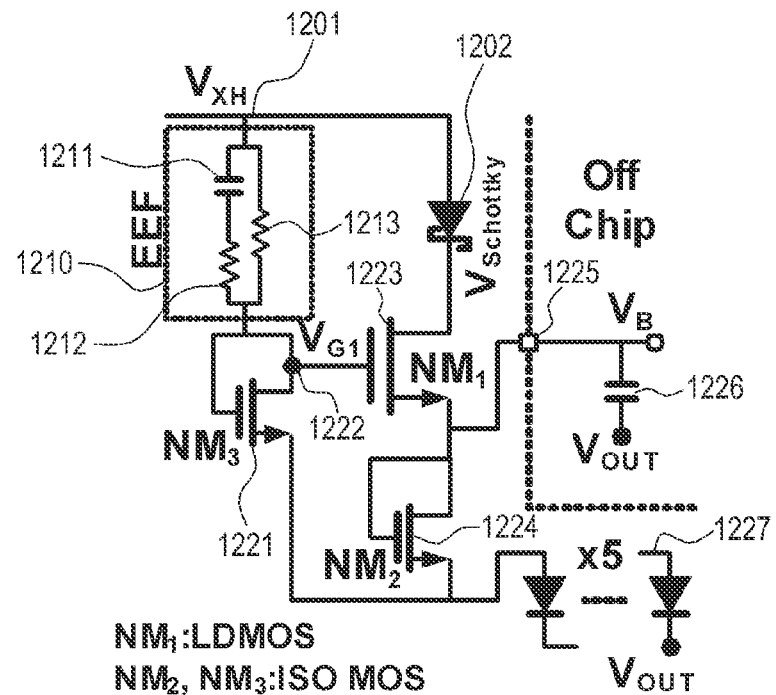
FIG. 12 is a circuit diagram illustrating a boost bias generator according to an embodiment of the present invention.

FIG. 12 is a circuit diagram illustrating a boost bias generator according to an embodiment of the present invention. For example, the boost bias generator shown in FIG. 12 may be connected to the node 531 of FIG. 5A and FIG. 9 and the output end $V_{out}$ FIG. 9.

An Edge Enhancement Filter (EEF) 1210 and a Schottky diode 1202 may be connected to the node 1201. The EEF 1210 includes a capacitor 1211, a resistor 1212 and a resistor 1213. The capacitor 1211 has, for example, an electrostatic capacity of 50 fF (femto Farad), the resistor 1212 has, for example, a resistance value of 700Ω, and the resistor 1213 has, for example, a resistance value of 10 kΩ. The EEF 1210 may be connected to the third sub-switch 1221. The third sub-switch 1221 is implemented with an FET, and the EEF 1210 is connected to a gate end of the third sub-switch 1221. A drain of the third sub-switch 1221 is connected to a gate of the first sub-switch 1223. A source of the third sub-switch 1221 is connected to a diode 1227 and a source of the second sub-switch 1224. A drain and a gate of a second sub-switch 1224 are connected to a source of a first sub-switch 123 and a node 1225. A capacitor 1226 is disposed between node 1225 and $V_B$. The Schottky diode 1202 may be connected to a drain of the first sub-switch 1223. In addition, a plurality of diodes 1227 are present, and for example, five diodes are employed.

In a case where switches 532, 533 and 534 of FIG. 9 are implemented with a N type MOSFET, for example, the boost bias generator is held to a predetermined voltage higher than a voltage $V_{out}$ of the output end to operate. The boost bias generator may generate a voltage to substantially operate the first switch 532 of FIG. 9. In the CCM mode, especially, when a high voltage is applied to $V_{XH}$ with switching between the $V_{out}$ and a $2V_{out}$, a boost bias provides a high voltage to the first switch 532.

Figure 13:
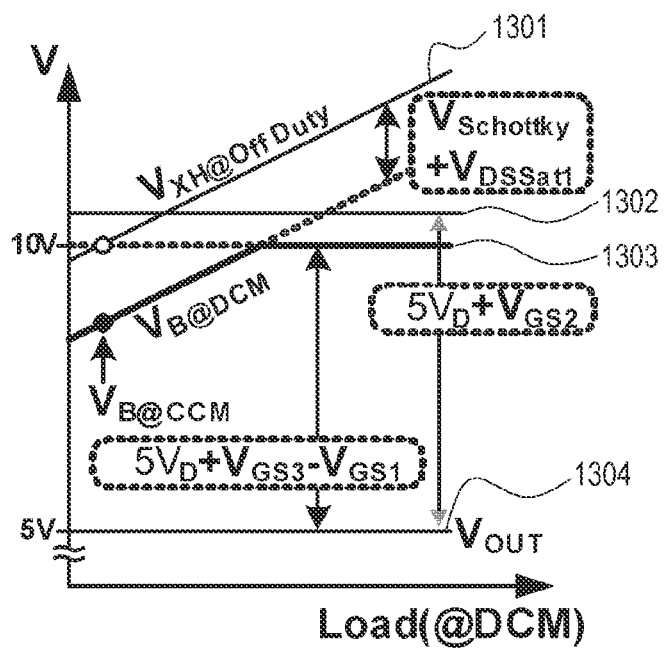
FIG. 13 is a graph illustrating a voltage applied to the boost bias generator.

Furthermore, the boost bias generator may hold a voltage $V_B$ applied to the node 1225 below a predetermined voltage of, for example, 10V. As shown in FIG. 13, the voltage $V_B$ applied to the node 1225 is held below the predetermined voltage of 10V. Therefore, the boost bias generator controls the switches 532, 533 and 534 to operate in a case where the switches 532, 533 and 534 are implemented with the N type MOSFET, and controls the switches 532, 533 and 534 so that an excessive voltage is not applied to the entire wireless electric power receiver.

For example, when a difference of a voltage of $V_{G1}$ and a threshold voltage $V_{th}$ of the first sub-switch 1223 is smaller than the voltage $V_B$, the first sub-switch 1223 may turn on. Moreover, when a difference of a voltage of $V_{G1}$ and a threshold voltage $V_{th}$ of the first sub-switch 1223 is larger than the voltage $V_B$, the first sub-switch 1223 may turn off. The boost bias generator operates based on the above mentioned operation.

While the present invention has been shown and described with reference to certain embodiments thereof, it will be understood by those skilled in the art that various changes in form and details may be made therein without departing from the spirit and scope of the present invention as defined by the appended claims. Therefore, various modified implementations can be made without departing from the substance of the present invention claimed in the appended claims, and the modified implementations should not be construed separately from the technical idea or concept of the present invention.

What is claimed is:

1. A wireless electric power receiver for receiving wireless electric power from a wireless electric transmitter, the wireless electric power receiver comprising:
    an electric power receiving unit that receives the wireless electric power from the wireless electric power transmitter;
    a rectifying unit that rectifies wireless electric power in the form of alternating current output from the wireless electric power receiving unit and outputs rectified electric power; and
    an electric power regulation unit that receives an input of the rectified electric power, and outputs first electric power which has a lower value of a first voltage than that of the rectified electric power for a first period while outputting second electric power which has a second voltage of the rectified electric power for a second period, so as to output electric power with a predetermined voltage value.

2. The wireless electric power receiver as claimed in claim 1, wherein the electric power regulation unit increases impedance of the wireless electric power receiver for the first period, and reduces impedance of the wireless electric power receiver for the second period.

3. The wireless electric power receiver as claimed in claim 1, wherein the electric power regulation unit increases electric power which is received by the wireless electric power receiving unit for the first period, and reduces electric power which is received by the wireless electric power receiving unit for the second period.

4. The wireless electric power receiver as claimed in claim 1, wherein the electric power regulation unit includes:
    a node connected to an output end of the rectifying unit;
    a first switch having one end connected to the node;
    a first capacitor having one end connected to the node;
    a second switch having one end connected to another end of the first capacitor;
    a third switch having one end connected to the another end of the first capacitor; and
    a second capacitor having one end connected to another end of the first switch and another end of the second switch, and another end connected to another end of the third switch.

5. The wireless electric power receiver as claimed in claim 4, wherein the electric power regulation unit controls the first and third switches to be in an on state and the second switch to be in an off state, for the first period.

6. The wireless electric power receiver as claimed in claim 5, wherein the electric power regulation unit connects the first capacitor and the second capacitor in parallel, and controls the first electric power having the first voltage to be output.

7. The wireless electric power receiver as claimed in claim 4, wherein the electric power regulation unit controls the first and third switches to be in an off state and the second switch to be in an on state, for the first period.

8. The wireless electric power receiver as claimed in claim 7, wherein the electric power regulation unit connects the first capacitor and the second capacitor in parallel, and controls the second electric power having the second voltage to be output.

9. The wireless electric power receiver as claimed in claim 1, wherein the electric power regulation unit includes a switch controller that controls the first switch, the second switch and the third switch based on at least one of a voltage applied to an output end of the electric power regulation unit, and a synchronization signal received in the electric power receiving unit.

10. The wireless electric power receiver as claimed in claim 9, further comprising a comparator that compares the voltage applied to the output end of the electric power regulation unit and a reference voltage, and outputs a comparison result to the switch controller.

11. The wireless electric power receiver as claimed in claim 10, wherein the electric power regulation unit sets the first period to be longer than an existing period if the voltage applied to the output end of the electric power regulation unit is larger than the reference voltage.

12. The wireless electric power receiver as claimed in claim 10, wherein the electric power regulation unit sets the first period to be shorter than an existing period if the voltage applied to the output end of the electric power regulation unit is smaller than the reference voltage.

* * * * *